March 26, 1963

O. H. BANKER 3,082,647

ACCESSORY DRIVE CONTROL MECHANISM

Original Filed Aug. 5, 1954

INVENTOR:
OSCAR H. BANKER
BY Charles P. Vojtech
ATT'Y

United States Patent Office 3,082,647
Patented Mar. 26, 1963

3,082,647
ACCESSORY DRIVE CONTROL MECHANISM
Oscar H. Banker, Evanston, Ill., assignor, by mesne assignments, to Fawick Corporation, Cleveland, Ohio, a corporation of Michigan
Original application Aug. 5, 1954, Ser. No. 448,053, now Patent No. 2,901,924, dated Sept. 1, 1959. Divided and this application June 29, 1959, Ser. No. 823,639
4 Claims. (Cl. 74—785)

This invention relates to change speed driving mechanisms which are particularly suitable for driving accessories usually associated with an automotive passenger vehicle. This application is a division of my copending application S.N. 448,053, filed August 5, 1954, now Patent No. 2,901,924, and entitled "Accessory Drive."

In the aforesaid copending application there is disclosed and claimed a two speed driving mechanism which depends upon a ball-type friction drive for effecting a drive other than at one-to-one ratio. The ball-type drive is quiet, but it does not have the torque capacity for a given size of mechanism possessed by a gear type drive. The latter mechanism on the other hand can transmit higher torque for the same size than the ball type, but it is less quiet.

Among the more general objects of this invention is to provide a two-speed gear type accessory drive for an automotive engine which will have high torque capacity, which wil be sufficiently small to adapt it to present automotive engines, which will be readily driven and lubricated from existing gearing at the front end of such engines, and which may be readily reached for service and replacement.

A more specific object of this invention is to provide a two-speed gear type transmission incorporating a one-way clutch which is so constructed that the transmission, including its one-way clutch, may be assembled on a bench and then inserted as a unit over the front end of an engine crankshaft and also removed as a unit therefrom.

As a further specific object, this invention has within its purview the construction of a two-speed transmission for an accessory drive to be driven from an automotive engine wherein a sprag-type clutch is used to establish one of the two speeds, said transmission being constructed to be assembled and handled as a unit, including the sprags.

Another specific object is the provision of a brake-operating device for a two-speed transmission which is simple, direct-acting and light in weight.

Figure 1:
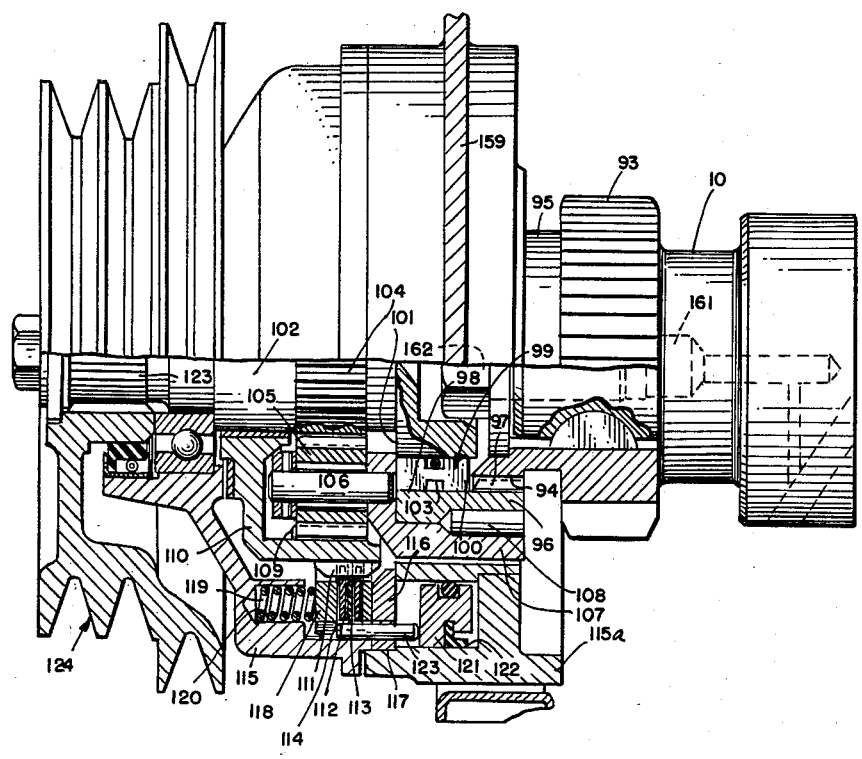
Figure 2:
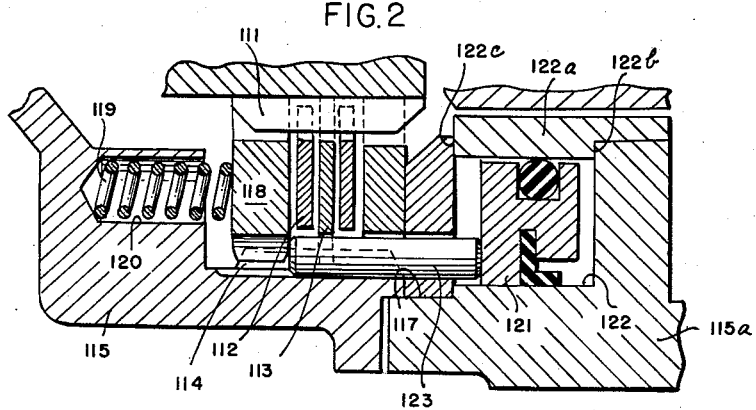

These and other objects of this invention will become apparent from the following detailed description when taken together with the accompanying drawings in which FIG. 1 is a side elevational view in quarter section of a transmission embodying this invention; and FIG. 2 is a fragmentary side elevational view in section and on an enlarged scale of the brake-operating portion of the transmission of FIG. 1.

Referring now to FIGS. 1 and 2, the engine crankshaft is shown at 10, to the forward end of which is keyed a gear 93 which may be the cam shaft timing gear, said gear 93 having external splines 94 formed on a smaller diameter step spaced from gear 93 by a run-out groove 95. A ring 96 surrounds splines 94 and has internal splines 97 in engagement with splines 94 so as to be driven by gear 93. A smooth cylindrical surface 98 is formed on the interior of ring 96 adjacent splines 97 and constitutes the outer race of a one-way clutch 99, the inner race 100 being formed on the exterior of a flange 101 on a driven or output shaft 102 concentrically disposed with respect to the axis of crankshaft 10. Between surfaces 100 and 98 are interposed a plurality of sprags 103 which function to provide a one-way drive between ring 96 and shaft 102 when the latter tends to rotate more slowly than ring 96. The drive through one-way clutch 99 is, of course, a direct drive so that the speed of rotation of driven shaft 102, when clutch 99 is effective, is the same as the speed of rotation of crankshaft 10.

The speed changing gearing is comprised of a sun gear 104 fixed to shaft 102 in any suitable manner so as to be rotatable therewith, and a plurality of planet pinion gears 105 arranged around the periphery of sun gear 104 and mounted for rotation on individual pins 106 fastened to a carrier 107. Said carrier 107 is telescoped over ring 96 and is secured thereto by a pin 108 which constrains carrier 107 to rotate with ring 96 which, in turn, is constrained to rotate with gear 93 and shaft 10.

Planet pinions 105 also mesh with a ring gear 109 formed on the interior of a drum 110 mounted for free rotation about shaft 102. The exterior of drum 110 is formed with teeth 111 to which are splined for axial movement thereon two or more friction brake plates 112 in the form of washers or annuli. The brake plates 112 are adapted to be engaged frictionally by one or more stationary annular plates 113 which are splined to teeth 114 formed on the interior of a fixed housing 115. Plates 112 and 113 are pressed together for frictional braking therebetween by a fixed reaction plate 116 retained against axial movement relative to housing 115 by a shoulder 117 formed on the interior of a companion housing 115a to which housing 115 is bolted, housing 115 being formed to bear directly against reaction plate 116 and to retain it frictionally against shoulder 117.

On the opposite side of plates 112 and 113 from reaction plate 116 is an axially movable pressure plate 118 which may also be splined to teeth 114 so as to be fixed angularly relative to housing 115. A plurality of springs 119 operating in circumferentially spaced recesses 120 in housing 115 continuously urge pressure plate 118 to the right as viewed in FIG. 1. Thus, when springs 119 are effective, pressure plate 118 is moved to the right to compress plates 112 and 113 against reaction plate 116, thereby holding plates 112 frictionally against rotational movement, which, in turn, causes drum 110 and ring gear 109 to be stationary. If at the time, carrier 107 is rotated by gear 93, sun gear 104 will, of course, be rotated in the same direction as shaft 10 but at a higher speed. By properly selecting the relative numbers of teeth on sun gear 104, ring gear 109 and planet pinions 105, any desired over-speed ratio may be provided.

Pressure plate 118 is controlled by an annular piston 121 axially reciprocable in a correspondingly annular cylinder 122 formed in part by companion housing 115a and in part by a ring 122a having a shoulder 122b abutting on companion housing 115a. The reaction plate 116 bears at its inner end upon the end 122c of ring 122a to hold said ring in the aforesaid abutting relation. Although piston 121 is on the opposite side of fixed reaction plate 116 from pressure plate 118, the latter is reached through a plurality of axially reciprocable pins 123 extending through suitable openings in plate 116 and adapted to be contacted by piston 121 at one end and pressure plate 118 at the other end. The length of pins 123 is such that full releasing movement of pressure plate 118 may be effected by piston 121 without having the latter strike reaction plate 116. It will be noted that pins 123 are shorter than the normal axial spacing between pressure plate 118 and piston 121 so that the latter will not interfere with the application of full spring pressure against pressure plate 118 and plates 112 and 113.

Piston 121 is operated by the same solenoid controlled hydraulic system which was described with reference to FIGS. 1 to 4 inclusive of my aforesaid copending application S.N. 448,053 and hence the details of this system have been omitted in the present specification. Suffice it to say that when fluid pressure is introduced into cylinder 122 to the right hand side of piston 121 as viewed in FIG. 2, the piston will move to the left and will engage and move pins 123 which, in turn, will cause pressure plate 118 to move in the same direction against the action of springs 119 to release plates 112 for rotation about shaft 102. The presence of a load on shaft 102 will cause a drive to be effected through one-way clutch 99 at the same speed as shaft 10. When the fluid pressure behind piston 121 is vented, springs 119 will cause pressure plate 118 to engage plates 112 and to compress them against plates 113 and reaction plate 116 to arrest the rotation of drum 110 and its internal ring gear 109, whereupon the drive will then be transmitted through the planetary gears 105 and sun gear 104 to shaft 102 at a speed which is greater than the speed of shaft 10.

The output end of shaft 102 is formed with splines 123 which drive a multiple pulley 124 from which the drive may be transmitted to the various accessories to be driven by the engine.

It may be noted that since external splines 94 are of a smaller outside diameter than the root diameter of the teeth of gear 93, said gear may be formed or finished by a broaching operation without interference from splines 94. It may also be observed that when it is desired to disassemble the entire change speed transmission shown in FIG. 1 from shaft 10, such disassembly may be accomplished by withdrawing housing 115 from housing 115a and in this manner removing plates 112 and 113, drum 110, planet gears 105, carrier 107, ring 96, clutch 99 and shaft 102 together as a unit. This is especially convenient inasmuch as clutch 99 is formed of a plurality of individual sprags which may tend to fall out and make their handling cumbersome and inconvenient unless they can be handled in assembled relation. The fact that splines 97 extend inwardly beyond surface 98 creates a retaining wall for the sprags by which they may be withdrawn as a unit. Similarly, when the transmission is to be assembled upon shaft 10, it may be noted that sprags 103 may be assembled with respect to surface 98 while they are in a vertical position, that is, with their axes pointing upward. Shaft 102 is then inserted into the transmission from the right as viewed in FIG. 1 and simultaneously turned in a free wheeling direction to facilitate movement of the sprags on surface 100. Once so assembled, the sprags may be carried with the change speed gearing and even tilted to a position wherein the axis of shaft 102 is horizontal or concentric with shaft 10 without in any way disturbing them.

The foregoing construction thus provides a rugged and readily serviced design which is well adapted for use on trucks, buses and other vehicles which normally get a great deal of wear and rough usage.

The transmission may be secured to any convenient forward part of the engine as for example, the timing gear cover 159 or to the engine block itself. It is desirable that the installation of the transmission will not interfere with other parts of the engine such as the pan 160. When the transmission is mounted on the forward end of crankshaft 10, it may be readily lubricated by utilizing the oil passage 161 in the crankshaft and extending it through the forward end of the shaft into the hollow portion of the shaft, the oil passing through passage 161 and then through drilled passageways 162 to the gears or balls as the case may be from which it may drain into pan 160.

It is understood that the foregoing description is merely illustrative of preferred embodiments of this invention and that the scope of the invention therefore will not be limited thereto but will be determined by the appended claims.

I claim:

1. In combination, a rotatable drive member having external splines, a change speed transmission having a sun gear, a ring gear, planet gears meshing with the sun and ring gears, and a planet gear carrier having a belled end extending axially away from the planet gears and toward the drive member, a cylindrical member rotatable with the sun gear, a substantially radially disposed surface in the belled end of the carrier, a ring in the belled end of the carrier having an internal cylindrical surface concentric with and radially spaced from the cylindrical member to provide an annular space therebetween, means for securing the ring to the said belled end, one-way camming devices disposed in the said annular space and adapted to cooperate with the cylindrical member and cylindrical surface to provide a drive therebetween, and radially inwardly extending splines on the ring adjacent the one-way camming devices, said radially disposed surface on the carrier belled end and the radially inwardly extending splines on the ring serving to confine the camming devices to a predetermined axial location on the cylindrical surfaces.

2. The combination described in claim 1, and friction means for securing the ring gear to the transmission housing, said friction means including overlapping friction discs on the housing and ring gear, a fixed reaction plate adjacent one side of the friction discs, a non-rotatable pressure plate on the other side of the discs and movable toward the reaction plate to engage the friction discs with one another and with the reaction and pressure plates, resilient means urging the pressure plate toward the reaction plate, and means on the side of the reaction plate opposite the discs and extending through the reaction plate for moving the pressure plate away from the reaction plate against the action of the resilient means.

3. The combination described in claim 1, said combination including further a housing for the rotatable drive member, said housing having an opening thereinto, an oil passage in the drive member opening upon the change speed transmission and normally supplying lubricant to said drive member, and a housing for the change speed transmission adapted to be secured to the housing for the rotatable drive member over the said opening thereinto, said oil passage also serving to lubricate the change speed transmission.

4. In combination, a rotatable drive member, a housing for the drive member, a secondary housing secured to the first-mentioned housing and defining part of an annular cylinder, a ring abutting on the secondary housing and defining the remaining part of said annular cylinder, a piston in said cylinder and reciprocable therein, a planetary change speed transmission driven from the drive member and including a reaction member, a transmission housing secured to the secondary housing, a reaction plate extending radially across the cylinder, and friction means for securing the reaction member to the transmission housing, said friction means including overlapping friction discs on the transmission housing and reaction member adjacent the reaction plate, a non-rotatable pressure plate on the side of the discs opposite the reaction plate and movable toward the reaction plate to engage the friction discs with one another and with the reaction and pressure plates, resilient means urging the pressure plate toward the reaction plate, and means on the side of the reaction plate opposite the discs and extending through the reaction plate for moving the pressure plate away from the reaction plate.

References Cited in the file of this patent

UNITED STATES PATENTS

| | | |
|---|---|---|
| 2,494,738 | Booth | Jan. 17, 1950 |
| 2,584,192 | Danly et al. | Feb. 5, 1952 |
| 2,656,736 | Ebsworth | Oct. 27, 1953 |
| 2,681,133 | Kindseth et al. | June 15, 1954 |
| 2,785,781 | Johansen | Mar. 19, 1957 |
| 2,959,396 | Lawrence | Nov. 8, 1960 |